(12) United States Patent
Gittleson (10) Patent No.: US 11,361,308 B1
(45) Date of Patent: Jun. 14, 2022

(54) DECENTRALIZED SYSTEM FOR PERFORMING BLOCKCHAIN-BASED TOKEN MANAGEMENT USING A SIDE-BLOCKCHAIN NETWORK

(71) Applicant: Virtue Gaming Holding Ltd., Ta'Xbiex (MT)

(72) Inventor: Ryan B. Gittleson, Brooklyn, NY (US)

(73) Assignee: Virtue Gaming Holding Ltd., Ta' Xbiex (MT)

( * ) Notice: Subject to any disclaimer, the term of this patent is extended or adjusted under 35 U.S.C. 154(b) by 0 days.

(21) Appl. No.: 17/520,788

(22) Filed: Nov. 8, 2021

(51) Int. Cl.
*G06Q 20/36* (2012.01)
*G06Q 20/40* (2012.01)
*A63F 13/71* (2014.01)

(52) U.S. Cl.
CPC ......... *G06Q 20/367* (2013.01); *G06Q 20/401* (2013.01); *A63F 13/71* (2014.09); *G06Q 2220/00* (2013.01)

(58) Field of Classification Search
None
See application file for complete search history.

(56) References Cited

U.S. PATENT DOCUMENTS

| 11,189,131 | B1* | 11/2021 | Weiksner | A63F 13/792 |
|---|---|---|---|---|
| 2017/0352027 | A1* | 12/2017 | Zhang | H04L 9/0825 |
| 2017/0372308 | A1* | 12/2017 | Metnick | G06Q 20/3829 |
| 2017/0372391 | A1* | 12/2017 | Metnick | G06Q 30/018 |
| 2017/0372392 | A1* | 12/2017 | Metnick | G06Q 30/018 |
| 2018/0040040 | A1* | 2/2018 | Barski | G06Q 20/0457 |
| 2018/0040041 | A1* | 2/2018 | Metnick | G06Q 30/0609 |
| 2018/0089685 | A1* | 3/2018 | McGregor | G06Q 20/367 |
| 2018/0089729 | A1* | 3/2018 | Metnick | G06Q 30/0601 |
| 2018/0091316 | A1* | 3/2018 | Stradling | G06F 12/1408 |
| 2018/0204260 | A1* | 7/2018 | McGregor | G06Q 30/0609 |
| 2018/0216946 | A1* | 8/2018 | Gueye | G01C 21/3617 |
| 2018/0218176 | A1* | 8/2018 | Voorhees | H04L 9/3213 |
| 2019/0081793 | A1* | 3/2019 | Martino | G06Q 20/065 |
| 2019/0172026 | A1* | 6/2019 | Vessenes | G06Q 20/3674 |
| 2019/0303807 | A1* | 10/2019 | Gueye | G01C 21/3679 |
| 2019/0356641 | A1* | 11/2019 | Isaacson | G06Q 20/384 |
| 2020/0242105 | A1* | 7/2020 | Rich | G06F 16/27 |

(Continued)

FOREIGN PATENT DOCUMENTS

| CN | 108683630 | B | * | 5/2020 | ......... G06F 21/577 |
| CN | 112883435 | B | * | 8/2021 | |
| CN | 113256293 | A | * | 8/2021 | |

OTHER PUBLICATIONS

Decentralizing Privacy: Using Blockchain to Protect Personal Data. 2015 IEEE CS Security and Privacy Workshops, http://homepage.cs.uiowa.edu/~ghosh/blockchain.pdf (Year: 2015).*

(Continued)

*Primary Examiner* — El Mehdi Oussir
(74) *Attorney, Agent, or Firm* — Sheppard Mullin Richter & Hampton LLP (57) ABSTRACT

A decentralized system is provided for using smart contracts executed on a side-blockchain network for performing token management by limiting token withdrawals from restricted wallets until an owner of the restricted wallet has met specified criteria and by permitting recapture of tokens from restricted wallets when the owner of the restricted wallet fails to meet the specified criteria within a specified time limit.

12 Claims, 5 Drawing Sheets

(56) References Cited

U.S. PATENT DOCUMENTS

| | | | | |
|---|---|---|---|---|
| 2021/0019737 A1* | 1/2021 | Vladi | ................. | G06Q 20/0658 |
| 2021/0082044 A1* | 3/2021 | Sliwka | ............. | G06Q 20/38215 |
| 2021/0126794 A1* | 4/2021 | Forrester | ................ | G06Q 40/02 |
| 2021/0182806 A1* | 6/2021 | Ornelas | ................. | H04L 9/0897 |
| 2021/0334794 A1* | 10/2021 | Metnick | ............... | G06Q 20/389 |
| 2021/0366586 A1* | 11/2021 | Ryan | ...................... | G06Q 20/20 |

OTHER PUBLICATIONS

Hyperledger Fabric: A Distributed Operating System for Permissioned Blockchains. https://dl.acm.org/doi/pdf/10.1145/3190508.3190538 (Year: 2018).*

Bitcoin-NG: A Scalable Blockchain Protocol. Ittay Eyal, Adem Efe Gencer, Emin Gün Sirer, and Robbert van Renesse, Cornell University, https://www.usenix.org/system/files/conference/nsdi16/nsdi16-paper-eyal.pdf (Year: 2016).*

* cited by examiner

DECENTRALIZED SYSTEM FOR PERFORMING BLOCKCHAIN-BASED TOKEN MANAGEMENT USING A SIDE-BLOCKCHAIN NETWORK

TECHNICAL FIELD

The present disclosure relates generally to decentralized systems and more particularly to performing blockchain-based token management.

SUMMARY

Transaction fees on main blockchain networks (e.g., the Ethereum main network) have risen to rates that are far too expensive for decentralized applications (DApps) to run efficiently, and transactions per second (tps) are still well behind comparable centralized systems. This has created an issue for running electronic games on blockchain networks.

In different countries, the legality of electronic games depends on whether the electronic games are being played for money. This difference results in two different classes of players: real money players and fake money players. It is not currently possible for games played on decentralized systems to allow real money players and fake money players to play electronic games together.

The present disclosure provides a decentralized system using smart contracts executed on a side-blockchain network for performing token management by limiting token withdrawals from restricted wallets until an owner of the restricted wallet has met specified criteria and by permitting recapture of tokens from restricted wallets when the owner of the restricted wallet fails to meet the specified criteria within a specified time limit.

While several features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 10 is a flow diagram of an embodiment of a method for blockchain-based token management using a side blockchain connected to a primary blockchain by a bridge The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a decentralized system is provided for performing token management by using smart contracts executed on a side-blockchain network. The smart contracts limit token withdrawals from restricted wallets of the side-blockchain network until an owner of the restricted wallet has met specified criteria. The smart contracts also permit recapture of tokens from restricted wallets when the owner of the restricted wallet has not met specified criteria within a time limit.

Figure 1:
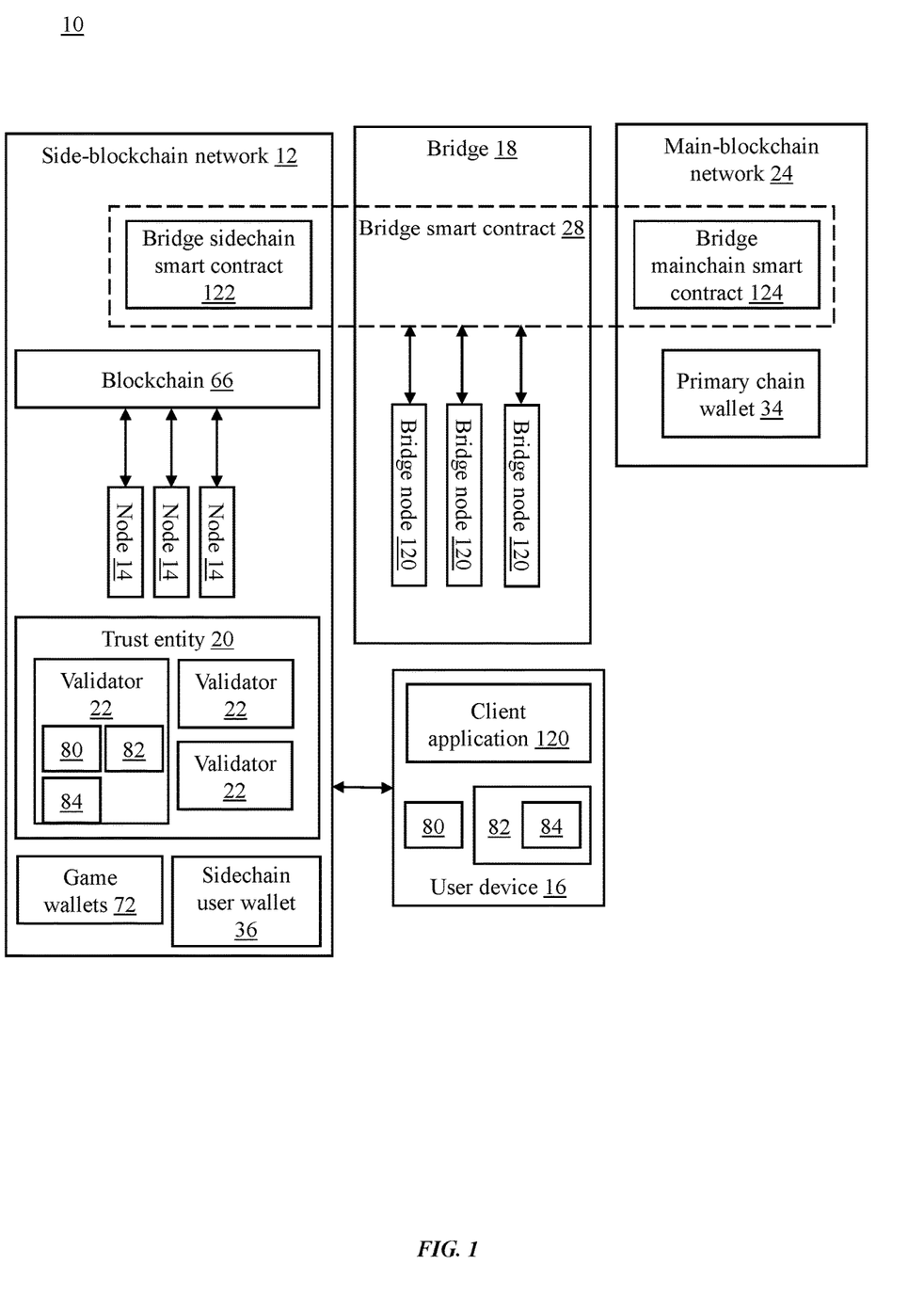
FIG. 1 is a schematic diagram of an embodiment of a decentralized system for performing blockchain-based token management.

Turning to FIG. 1, an exemplary embodiment is shown of a decentralized system 10 for performing blockchain-based token management using a side-blockchain network 12. the decentralized system 10 includes a side-blockchain network 12 in communication with a plurality of user devices 16, and a cross-chain bridge (also referred to as a bridge) 18. The side-blockchain network 12 includes a plurality of nodes 14 and a trust entity 20. The cross-chain bridge 18 is in data communication with the side-blockchain network 12 and a main-blockchain network 24 for transferring digital assets 26 between the side-blockchain network 12 and the main-blockchain network 24 by executing a bridge smart contract 28.

The decentralized system 10 may use the main-blockchain network 24 (e.g., the Ethereum blockchain) to manage all funds transfers (e.g., deposits and payouts). Because transaction fees and performance may be issues on the main-blockchain network 24, the decentralized system 10 moves higher-frequency, lower-value in-game transactions to the side-blockchain network 12 (e.g., a private blockchain). The side-blockchain network 12 communicates with the main-blockchain network 24 via the bridge 18.

Figure 2:
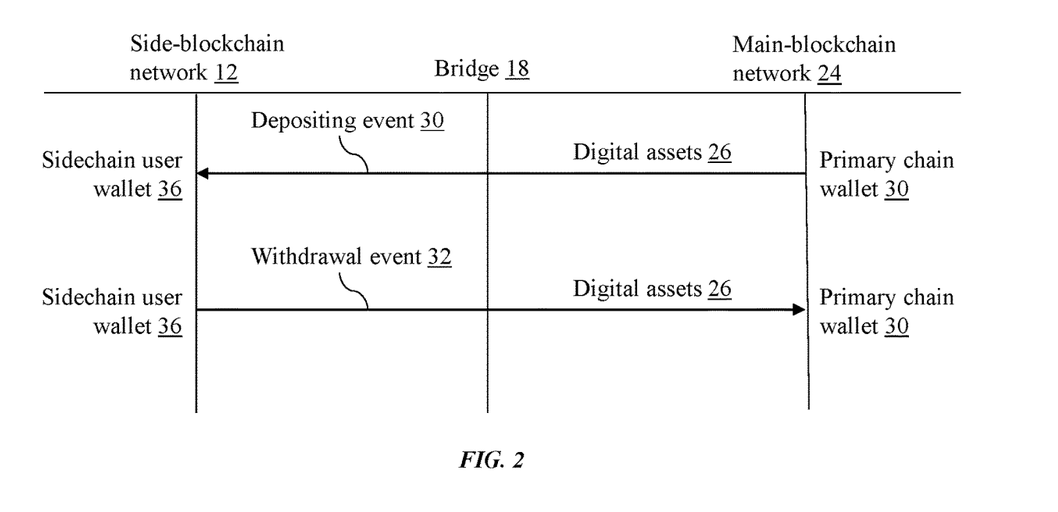
FIG. 2 is an exemplary ladder diagram showing a depositing event and a withdrawal event.

With exemplary reference to FIG. 2, the transfer of the digital assets 26 by the cross-chain bridge 18 includes both depositing events 30 and withdrawal events 32. A depositing event 30 transfers assets 26 from a primary chain wallet 34 to a sidechain user wallet 36. Conversely, a withdrawal event 32 transfers assets 26 from a sidechain user wallet 36 to a primary chain wallet 34.

Figure 3:
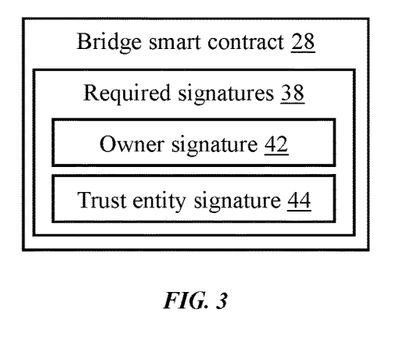
FIG. 3 is a schematic diagram of a bridge smart contract.

Turning with exemplary reference to FIG. 3, at least two required signatures 38 are required for the bridge smart contract 28 to perform a withdrawal event 32: a signature of an owner 42 of the identified sidechain user wallet 36 and a signature of the trust entity 44. The owner may sign 42 the bridge smart contract 28 for the withdrawal event 32 when requesting the withdrawal. For example, the owner may sign the bridge smart contract 28 by sending a transaction to configure the bridge smart contract 28.

When a smart contract is described herein as being modified in some way (e.g., being signed, initiating, etc.), this modification may be performed by a computing device (e.g., the trust entity 20, a node 14, bridge node 120, user device 16, etc.) sending a transaction to the smart contract (e.g., on the side-blockchain network 12) to perform the modification.

The trust entity 20 signs a bridge smart contract 28 for a withdrawal event 32 (1) when the sidechain user wallet 36 is an unrestricted wallet or (2) when the sidechain user wallet 36 is a restricted wallet and the account associated with the sidechain user wallet 36 has met specified criteria 50. Conversely, the trust entity 20 does not sign a bridge smart contract 28 for a withdrawal event 32 when the sidechain user wallet 36 is a restricted wallet and the account associated with the sidechain user wallet 36 has not met the specified criteria 50.

In one embodiment, the trust entity 20 signs the bridge smart contract 28 by sending a transaction to configure the bridge smart contract 28 when an account has met the specified criteria 50. That is, instead of waiting for a withdrawal 32 or depositing event 30 and then signing the bridge smart contract 28 (e.g., by sending a transaction to configure the bridge smart contract 28 to approve the withdrawal 32 or depositing event 30), the trust entity 20 instead signs the bridge smart contract 28 when an account meets the specified criteria 50. In this way, the trust entity 20 may be considered to have signed or not signed an event 30, 32 before the event 30, 32 has been requested. In one example, the trust entity 20 continuously maintains a state of the bridge smart contract 28 by monitoring for when accounts meet the specified criteria 50 and updating the bridge smart contract 28 accordingly.

As described above, a trust entity 20 may be required to sign a bridge smart contract 28 for a withdrawal event 32 to be performed and a trust entity determines whether an account associated with a sidechain user wallet 36 has met specified criteria before signing a withdrawal event 32. When the bridge smart contract 28 for a deposit event 30 has received the two required signatures 38, the bridge smart contract 28 may be executed by the bridge nodes 120, such that the withdrawal event is performed.

In one embodiment, limiting players from withdrawing funds until specified criteria are met allows for the side-blockchain network 12 to have real money players play electronic games against players that did not provide their own funds, but rather received funds from another source (e.g., also referred to as play to earn players). For example, in the US where playing poker online for real money is currently illegal, it may be legal for US players to play against real money players using funds (i.e., tokens, digital assets, etc.) provided as part of a promotion (e.g., the player only gets to keep the funds if the player meets the specified criteria).

Figure 4:
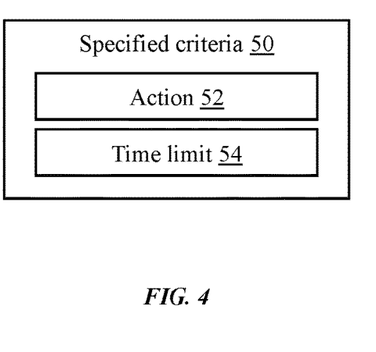
FIG. 4 is a schematic diagram showing an exemplary specified criteria.

In the embodiment depicted in FIG. 4, the specified criteria 50 identifies at least one action 52 that the account associated with the sidechain user wallet 36 is required to take within a time limit 54. For example, the specified criteria 50 may specify that an account must play one thousand (1,000) hands of a card game to withdraw sidechain digital tokens 56 from their sidechain user wallet 36. In this example, the sidechain digital tokens 56 may have been given to the owner 58 of the account as part of a promotional event. In the promotional event, players may be given an amount of sidechain digital tokens 56 to play with. Players may only withdraw these tokens if they have played an identified number of hands within a time limit 54. If the players meet this specified criteria 50, then the players may be able to withdraw any remaining sidechain digital tokens 56.

In addition to signing bridge smart contracts 28, the trust entity 20 also executes identity smart contracts 62. In one embodiment, the identity smart contract has two main purposes: holding user funds; and creating permissioned access to the side-blockchain network 12. The identity smart contract 62 may also allow the users to request the trust entity 20 to update their game play wallet (e.g., in case of a computer crash and the game play wallet is missing). The identity smart contract 62 may approves by ins and may allow for ownership of a user's wallet to be transferred.

In addition to limiting player withdrawals using the trust entity 20 (e.g., allowing the side-blockchain network to prevent transfer of fund s out of the side-blockchain network until the specified criteria 50 have been met), the identity smart contract 62 allows the trust entity 20 to recover digital assets 26. In one embodiment, the identity smart contract 62 controls access to the sidechain user wallets 36 by removing the digital assets 26 from each of the restricted wallets 48 when the account 52 associated with the sidechain user wallet 36 has not met the specified criteria 50. In the above example, if a player does not play the required 1,000 hands within 30 days, then the digital assets 26 supplied to the player may be removed from the player's sidechain user wallet 36.

In one embodiment, the bridge 18 has two core functions: (1) to relay transactions between the main-blockchain network 24 and the side-blockchain network 12, and (2) to secure the funds transferred from the main-blockchain network 24 to the side-blockchain network 12. The bridge may also be used to limit withdrawal events 32 and deposit events 30. For example, withdrawal requests for individual players may be blocked if the player is suspected of cheating, money laundering, etc. The bridge 18 may also be used to set deposit limits, and even block deposit attempts from unverified users.

Figure 5:
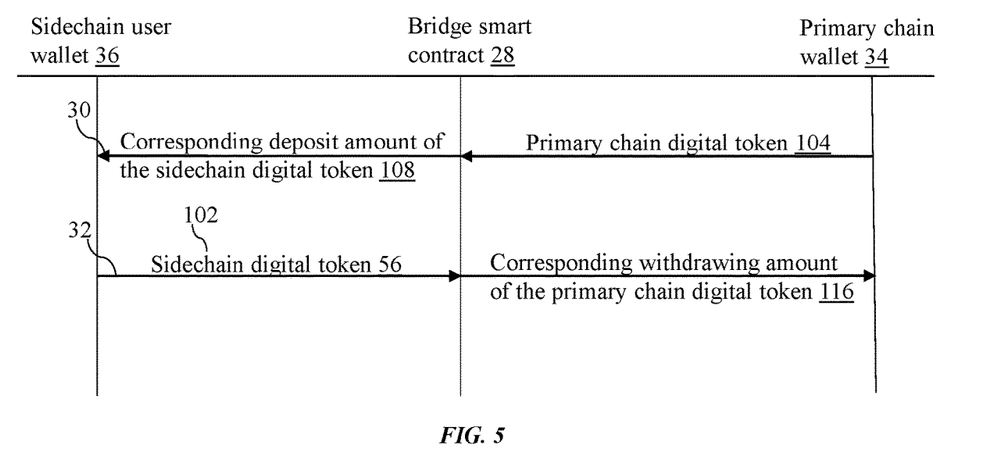
FIG. 5 is an exemplary ladder diagram showing transfer of assets between a primary chain wallet and a sidechain user wallet.
Figure 6:
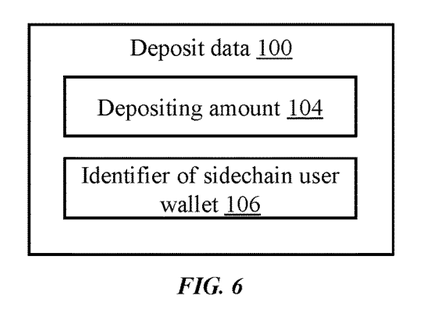
FIG. 6 is a schematic diagram of deposit data.

As described above and with exemplary reference to FIG. 5, in response to being executed, the bridge smart contract 28 transfers digital assets 26 between one or more primary chain wallets 34 and the sidechain user wallets 36. The transfer of the digital assets 26 includes both depositing events 30 and withdrawal events 32. The depositing events 30 include receiving deposit data 100 from the cross-chain bridge 18 and transferring a corresponding deposit amount of a sidechain digital token 102 to one or more sidechain user wallets 36. In the exemplary embodiment shown in FIG. 6, the deposit data 100 includes a depositing amount of a primary chain digital token 104 and an identifier of at least one primary chain user wallets 144. One or more sidechain user wallets associated with the identified at least one primary chain user wallets 114 may be determined by the system 10. For example, the sidechain bridge smart contracts may map (i.e., associate) primary chain user wallet(s) to sidechain user wallet(s). As another example, the trust entity 20 may use a lookup table to determine the at least one sidechain user wallets associated with identified at least one primary chain user wallets 114. Alternatively, the deposit data 100 may including an identifier for at least one sidechain user wallets. The corresponding deposit amount of the sidechain digital token 108 corresponds to the depositing amount of the primary chain digital token 104.

Figure 7:
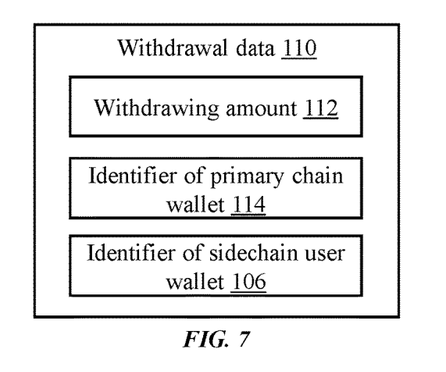
FIG. 7 is a schematic diagram of withdrawal data.

The withdrawal events 32 include receiving withdrawal data 110 and transferring a corresponding withdrawing amount 112 of the primary chain digital token 104 to the identified at least one of the primary chain wallets 34 from the at least one sidechain user wallet 36 associated with the identified at least one of the primary chain wallets 34. In the exemplary embodiment shown in FIG. 7, the withdrawal data 110 includes a withdrawing amount 112 of the sidechain digital token 56 and an identifier of at least one primary chain wallet 114. The corresponding withdrawing amount of the primary chain digital token 116 corresponds to the withdrawing amount 112 of the sidechain digital token 56.

As described above, the side-blockchain network 12 is a separate blockchain that is attached to the main-blockchain network 24 using a bridge 18. For example, the side-blockchain network 12 may be any programmable blockchain usable by an application to handle higher-frequency lower-value transactions that would be expensive to process on the main-blockchain network (e.g., Ethereum mainnet) and that can be customized to suit the business needs of a decentralized application (DApp). In one embodiment, the side-blockchain network 12 is a private blockchain. As a private blockchain, certain data may be kept private by the side-blockchain network. For example, the results of electronic games may be kept private.

The side-blockchain network 12 may be aligned in parallel with the main-blockchain network 24 and the bridge 18 allows for the digital assets 26 to move between the side-blockchain network 12 and main-blockchain network 24 and to be used across the side-blockchain network 12 and main-blockchain network 24. For example, the bridge 18 may act as a relayer (i.e., allowing assets 26 to move between the two chains) and as a gatekeeper (i.e., used to ensure transactions between the side-blockchain network 12 and main-blockchain network 24 are conducted in a secure manner). In one embodiment, the side-blockchain network is built on top of Kaleido (an AWS Market Application that provides Blockchain as a Service (BaaS)).

Figure 8:
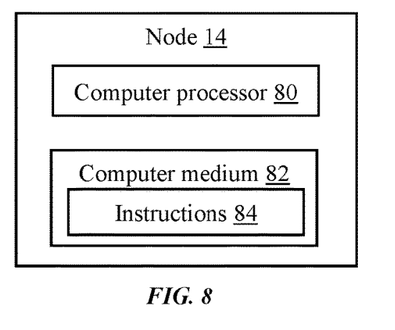
FIG. 8 is a schematic diagram of a node.

In the embodiment shown in FIG. 8, each node 14 of the side-blockchain network 12 includes a computer processor 80 and a non-transitory computer-readable storage medium 82 including a plurality of executable instructions 84. In response to executing the plurality of executable instructions 84, the computer processor 80 of each node 14 is configured to execute sidechain smart contracts 64 and a copy of a blockchain 66 of the side-blockchain network 12. The blockchain of the side-blockchain network includes game wallets 72. The sidechain smart contracts 64 include a table factory smart contract 68 and table smart contracts 70.

As is described in further detail below, the decentralized system 10 may be utilized for performing electronic games 95 and electronic gaming events 96. A table smart contract 70 may represent a single instance of a game (e.g., a poker table where multiple hands of poker will be played). That is each game (e.g., each poker table) on the side-blockchain network 12 may be represented by a new table smart contract 70.

Figure 9:
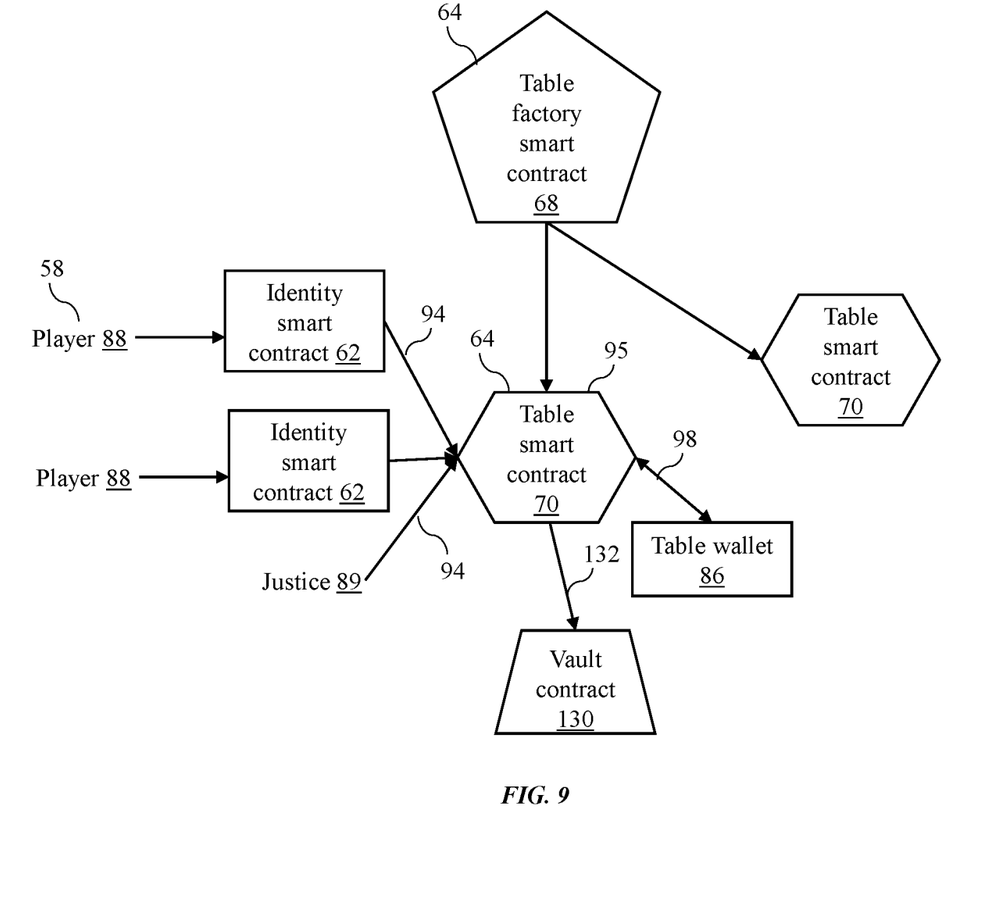
FIG. 9 is a schematic diagram showing interaction of smart contracts of the side-blockchain network.

In the embodiment shown in FIG. 9, the table factory smart contract 68 deploys the table smart contracts 70. When the table factory smart contract 68 creates a table smart contract 70, the table smart contract 70 may be configured with the desired parameters for the electronic game 95 represented by the table smart contract 70. The desired parameters may be passed by an operator to the table factory smart contract 68 along with the request for creating the table smart contract 70.

In one embodiment, the table smart contracts 70 represent each one of the tables available for play. The table smart contract 70 may keep track of the players 88 that are seated and their stakes. The table smart contracts 70 may receive the hand reports generated at the end of each hand to update the stakes of each player 88 (e.g., as is described in further detail below, validating the signatures of the players 88).

In one embodiment, the table smart contracts 70 controls players 88 joining an electronic game 95 by receiving buy-ins from players 88. That is, each of the table smart contracts 70 may be associated with a table wallet 86 comprising at least one of the game wallets. Each of the table smart contracts 70 join at least one of the accounts 49 as a player 88 of the table smart contract 70 by transferring digital assets 26 from the sidechain user wallet 36 of the player 88 to a table wallet 86 associated with the table smart contract 70. The transferred digital assets 26 may be stored in the table wallet 86; such that the digital assets 26 are associated with the transferring player 88. An electronic game event 96 may begin when one or more players 88 have joined the electronic game 95 via the associated table contract 70.

During gameplay (i.e., during an electronic gaming event 96), all blockchain transactions may occur in the side-blockchain network 12. As described above, this removes transaction costs for the player 88 compared to if the transactions were occurring on the main-blockchain network 24, where transactions costs (e.g., Ethereum gas) may be required for every transaction to occur on the main-blockchain network 24.

In one embodiment, the table smart contract 70 includes the game parameters: e.g., buy-in amount, game type, payout structure, number of players, etc. The table smart contract 70 may include a chip counter to keeps track of players' stakes at each table.

Each of the table smart contracts 70 also track as available funds the digital assets 26 stored in the table wallet 86 for each of the players 88. This tracking of available funds includes receiving results 94 of an executed electronic game event 96 associated with the table smart contract 70. The results 94 include a funds update 98 identifying changes in the available funds for at least one of the players 88. This tracking of funds may also include paying players 88 out as they exit the game by crediting the player's sidechain user wallet 36 with the appropriate amount based on the game outcome. For example, each of the table smart contracts 70 may remove at least one of the players 88 from the table smart contract 70 by transferring the available funds from the table wallet 86 for the player to the sidechain user wallet 36 of the player 88.

Each user device 16 has an account associated with a sidechain user wallet 36. In one embodiment, each of the side chain user wallets 36 (i.e., each sidechain user wallet associated with a user device 16) is either a restricted wallet or an unrestricted user wallet.

Each user device 16 also includes a computer processor 80 and a non-transitory computer-readable storage medium 82 including a plurality of executable instructions 84 executable by the computer processor 80.

In addition to players 88, the table smart contract 70 may also identify justices 89. The justices 89 may be non-players used to ensure that the results of the electronic game events 96 are accurately reported to the table smart contract 70. The justices perform justice services by observing the electronic gaming event 96, and before the result of the electronic game event is reported to the table smart contract 70, the justice 89 digitally signs the result of the electronic game event 96. The table smart contracts 70 may identify the justices 89 that are permitted to perform justice services at the table.

The plurality of justices 89 each including a computer processor 80, a non-transitory computer-readable storage medium 82 including a plurality of executable instructions 84.

The trust entity 20 (also referred to as an application backend) is one or more computing device(s) including a computer processor 80 and a non-transitory computer-readable storage medium 82 including a plurality of executable instructions 84. In response to executing the plurality of executable instructions 84, the computer processor 80 of the trust entity 20 is configured to sign a bridge smart contract 28 and to execute an identity smart contract 62. For example, the trust entity 20 may be a server or cluster of servers.

The cross-chain bridge 18 includes one or more bridge nodes 120. Each bridge node 120 includes a computer processor 80 and a non-transitory computer-readable storage medium 82 including a plurality of executable instructions 84. As described above, in response to executing the plurality of executable instructions 84, the computer processor 80 of each bridge node 120 is configured to execute a bridge smart contract 28.

The bridge 18 may be managed by a set of bridge nodes 120 acting as validators. The bridge nodes 120 may be required to approve all transactions to the bridge smart contract 28. These bridge nodes 120 may include trusted entities who are responsible for the gatekeeping service. For example, fora deposit or withdrawal from the sidechain escrow contract to be completed, a predetermined number of digital signatures may be required from the bridge nodes 120.

The bridge 18 may be an application, or set of applications, that provides the link between the side-blockchain network 12 (also referred to as a sidechain or private sidechain) and the main blockchain network 24 (e.g., the Ethereum blockchain). The bridge 18 may utilize the bridge smart contract 28 to enable communication of assets between the main-blockchain network 24 and the side-blockchain network 12. The bridge smart contract 28 may include a bridge sidechain smart contract 122 and a bridge mainchain smart contract 124. That is, the bridge 18 may be responsible for sending transactions between the bridge sidechain smart contract 122 and the bridge mainchain smart contract 124. The bridge sidechain contract 122 may be deployed in the side-blockchain network 12 and receive a transaction (e.g., a transfer of digital assets 26) from the bridge 18 to deposit assets (e.g., sidechain digital tokens 56) in the sidechain user wallets of players 88. The bridge mainchain contract 124 may be deployed in the main-blockchain network 24 and allow players to deposit primary chain digital tokens 104 (e.g., ETH or VPP) from their primary chain wallet 34 (also referred to as a mainnet wallet) into the side-blockchain network 12.

The bridge 18 may send approvals for deposits and withdrawals using a multi-signature (multisig) wallet. A multisig wallet has a set of pre-defined owners, and transactions must be approved with a predetermined set of signatures from owners. For example, a multi-signature wallet with five owners may require three of the five owners to verify a transaction before a transaction is approved to be sent. For example, every owner of the multisig wallet may have a private key that the owners must use to sign and verify a transaction. In the above example, three signers may be required to approve a transaction so there is no single point of control (or failure).

For the cross-chain bridge 18, the bridge nodes 120 may be owners with respect to the bridge 18 and each bridge node 18 may run the bridge smart contract 28. In one embodiment, the bridge sidechain smart contract 122 mints the funds that have been deposited and burns the funds that will be withdrawn. The bridge mainchain smart contract 124 may hold the funds that have been deposited to the side-blockchain network 12 and allow the bridge nodes 120 (e.g., a set of entities with cryptographic credentials) to unlock the funds for players performing withdrawals. Both the bridge sidechain smart contract 122 and the bridge mainchain smart contract 124 may verify the identity of the trust entity 20.

In one embodiment, to initiate a deposit into the side-blockchain network 12, a player may submit a transaction (e.g., an Ethereum transaction) to the bridge mainchain smart contract 124 located on the main-blockchain network 24. For example, the bridge nodes 120 may monitor the bridge mainchain smart contract 124 waiting for a deposit event 30 (also referred to as a deposit transaction). When a deposit event 30 is received, one bridge node 120 may read the deposit event 30 and sign the deposit event 30. Another bridge node 120 may read the deposit event 30 and also sign the deposit. At this point, the minimum number of signatures may have been reached (i.e., if the minimum number of signatures is two) and the deposit event 30 may be sent to the bridge sidechain smart contract 122.

A similar process for withdrawal events 32 may be used with bridge nodes 120 receiving a bridge sidechain smart contract 122 for a withdrawal event 32. The bridge nodes 120 may then individually sign a bridge mainchain smart contract 124 for the withdrawal event 32. Once the bridge mainchain smart contract 124 has received at least the minimum number of signatures for approval, the withdrawal event 32 may be conducted. This process of bridge node 120 approval helps ensure the security of both withdrawals and deposits from and to the side-blockchain network 12.

The bridge mainchain smart contract 124 may escrow all player funds. The bridge mainchain smart contract 124 may be transparent and all transactions to or from this contract may be viewable on the main-blockchain network 24.

In one embodiment, there is a one-to-one relationship between the assets of the main-blockchain network 24 and the side-blockchain network 12. That is, the bridge main contract 124 may hold the same number of sidechain digital tokens 56 that are available in the side-blockchain network 12. Rather than a transfer of assets 26 between the side-blockchain network 12 and the main-blockchain network 24, the main-blockchain network assets may be locked in the bridge smart contract 28 when a deposit is made. That is, after the bridge 18 sends a transaction to the side-blockchain network 12, the primary chain digital token 104 that is deposited may be locked in the bridge smart contract 28 and the same amount of the sidechain digital token 56 may be minted and sent to the player 88 in the side-blockchain network 12.

In one embodiment, the decentralized system 10 additionally includes a client application 120 executed on the plurality of user devices 16 and in communication with the side-blockchain network 12. The client application 120 executes the electronic game event 96 and provides the result 94 of the electronic game event 96 to the table smart contract 70 associated with the electronic game event %. Before the result 94 of the electronic game event 96 is reported to the table smart contract 70, each player 88 involved with the electronic game event 96 may digitally sign the result 94 of the electronic game event 96.

Each player 88 may digitally sign the result of each electronic game event 96 (e.g., a result of a hand of poker) in any suitable manner. For example, each player 88 may digitally sign the result with a private key (e.g., the private key of a sidechain user wallet 36 or primary chain wallet 34).

In one embodiment, the client application 120 running on a first user device 16 communicates with the client application 120 running on other user devices 16 through a peer-to-peer (P2P) network. The client application 120 may connect to the side-blockchain network 120 through an application programming interface (API)(e.g., the Amazon Web Services (AWS) API). The client application 120 may be based on a decentralized architecture.

The nodes 14 of the side-blockchain network 12 may also execute a vault contract 130. The vault contract 130 may be where revenue 132 generated on the side-blockchain network 12 is stored. For example, the vault contract may receive a rake (e.g., a percentage of funds associated with a result) after each electronic game event 96 (e.g., for cash games), after completion of an electronic game 95 (e.g., when a sit & go table has been completed), and/or as a transaction fee for a player 88 withdrawing funds to the main-blockchain network 24.

The data contained in the blockchain of the side-blockchain network may be replicated by each node that verifies new transactions and maintains the updated state of the blockchain of the side-blockchain network. In this way, the risk of data loss from the blockchain of the side-blockchain network is reduced.

Figure 10:
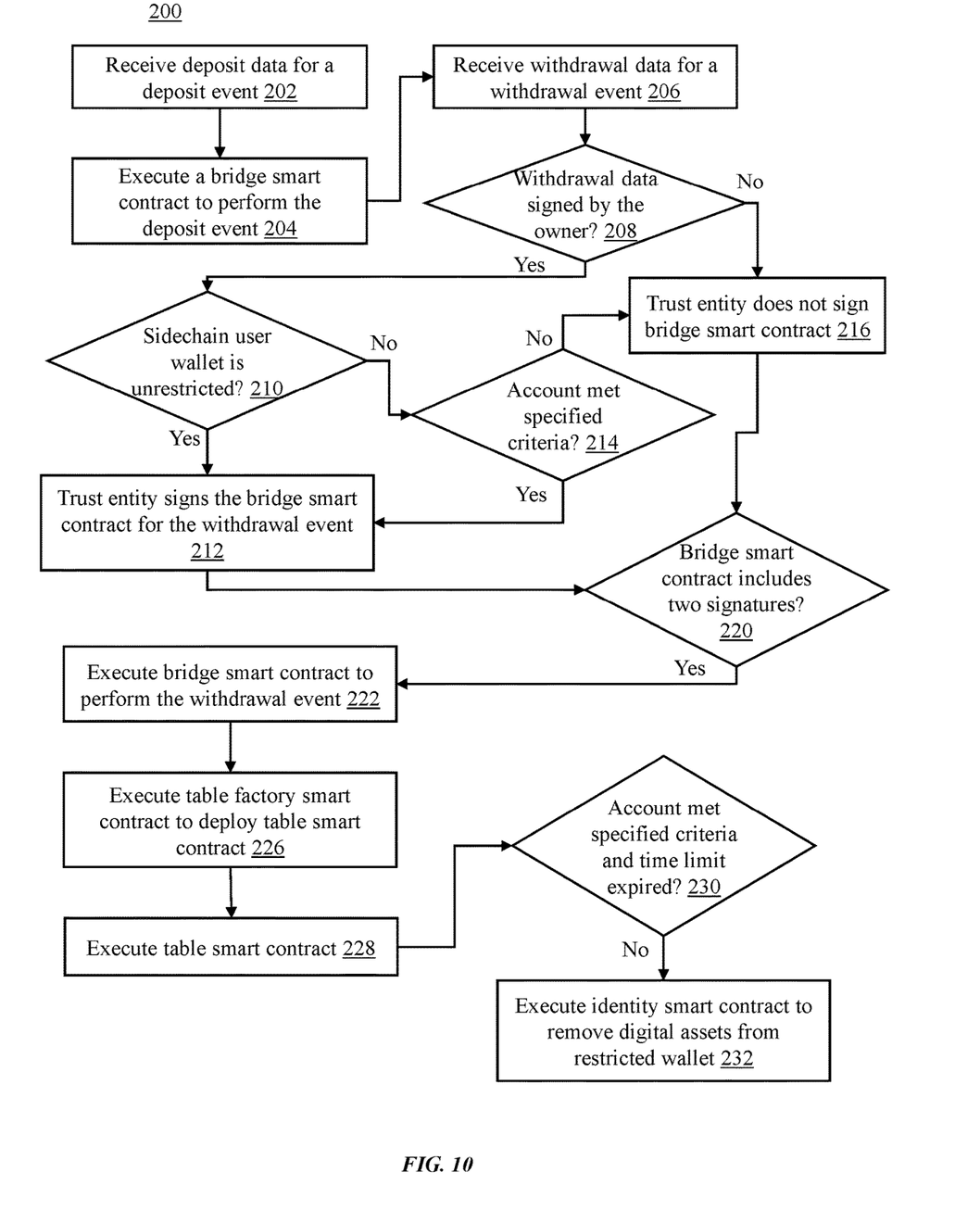

Turning to FIG. 10, a method 200 for blockchain-based token management is shown. In step 202, the side-blockchain network 12 receives deposit data 100 from the cross-chain bridge 18 including a depositing amount of a primary chain digital token and an identifier of at least one primary chain user wallets 114. In step 204, the side-blockchain network 12 executes a bridge smart contract 28 to transfer a corresponding deposit amount of a sidechain digital token to at least one of the sidechain user wallets associated with the identified at least one primary chain user wallets.

In step 206, the side-blockchain network 12 receives withdrawal data 110 associated with a withdrawal event 32. The withdrawal data 110 includes a withdrawing amount 112 of the sidechain digital token 56 and an identifier of at least one primary chain wallet 114. In determining step 208, a check is performed by the trust entity 20 to determine whether the received withdrawal data 110 has been signed by the owner 42 of the identified sidechain user wallet 36. If yes, processing moves to determining step 210. In determining step 210, a check is performed to determine whether the sidechain user wallet 36 is an unrestricted wallet. If yes, processing moves to step 212. In step 212, the trust entity signs 20 the bridge smart contract 28 for the withdrawal event 32.

If determining step 210 finds that the sidechain user wallet 36 is a restricted wallet, then processing moves to step 214. In step 214, the trust entity 20 determines whether the account associated with the sidechain user wallet 36 has met specified criteria. If yes, the processing moves to step 212 and the trust entity 20 signs the bridge smart contract 28 for the withdrawal event 32. If the account associated with the sidechain user wallet 36 has not met specified criteria in step 214, then processing moves to step 216 and the trust entity 20 does not sign the bridge smart contract 28.

Following steps 212 and 216, processing moves to determining step 220. In determining step 220, a check is performed to determine whether the bridge smart contract 28 associated with the received withdrawal data 110 includes at least two required signatures 38. If yes, processing moves to step 222 and the bridge smart contract 28 is initiated to transfer a corresponding withdrawing amount of the primary chain digital token 116 to the identified at least one of the primary chain wallets 34 from the identified sidechain user wallet 36.

In step 226, the table factory smart contract 68 is executed to deploy one or more table smart contracts 70. In step 228, the deployed table smart contract 70 is executed. As described above, executing the table smart contract 70 may join at least one player 88 by transferring digital assets 26 from the sidechain user wallet 36 of each of the at least one player 88 to a table wallet 86 associated with the table smart contract 70, such that the transferred digital assets 26 stored in the table wallet 86 are associated with the player 88. Executing the table smart contract 70 may also track as available funds the digital assets 26 stored in the table wallet 86 for each of the players 88 including receiving results of an executed electronic game event 96 associated with the table smart contract 70. Executing the table smart contract 70 may additionally remove at least one of the players 88 from the table smart contract 70 by transferring the available funds for the player 88 from the table wallet 86 to the sidechain user wallet 36 of the player 88.

In determining step 230, a check is performed to determine whether an account has met the specified criteria 50 and whether the time limit 54 has expired. For example, if a user was given 1,000 tokens that are to be returned unless the user player 1,000 hands of poker within 30 days, the remainder of the 1,000 tokens may be removed from the user's account if after 30 days the user has not met the requirement of playing 1,000 hands of poker. If the account has not met the specified criteria 50 and the time limit 54 has expired, then in step 232 the identity smart contract 62 is executed to remove the digital assets 26 from each of the restricted wallets when the account associated with the sidechain user wallet 36 has not met the specified criteria.

As described above, the nodes 14, user devices 16, bridge nodes 120, and trust entity 20 may each be any computer device including computer processors 80 and non-transitory computer readable medium 82. The computer processor 80 may have various implementations. For example, the computer processor 80 may include any suitable device, such as a processor (e.g., CPU), programmable circuit, integrated circuit, memory and I/O circuits, an application specific integrated circuit, microcontroller, complex programmable logic device, other programmable circuits, or the like. The computer processor 80 may also include a non-transitory computer readable medium, such as random-access memory (RAM), a read-only memory (ROM), an erasable programmable read-only memory (EPROM or Flash memory), or any other suitable medium. Instructions 84 for performing the method described below may be stored in the non-transitory computer readable medium and executed by the computer processor 80. The computer processor 80 may be communicatively coupled to the computer readable medium 82 and network interface through a system bus, mother board, or using any other suitable structure known in the art.

As will be understood by one of ordinary skill in the art, the computer readable medium (memory) 82 may be, for example, one or more of a buffer, a flash memory, a hard drive, a removable media, a volatile memory, a non-volatile memory, a random-access memory (RAM), or other suitable device. In a typical arrangement, the computer readable medium 82 may include a non-volatile memory for long term data storage and a volatile memory that functions as system memory for the processor 82. The computer readable medium 82 may exchange data with the circuitry over a data bus. Accompanying control lines and an address bus between the computer readable medium 82 and the circuitry also may be present. The computer readable medium 82 is considered a non-transitory computer readable medium.

The instructions 84 may be any suitable computer executable instructions for performing the actions, steps, method, etc. described above.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A decentralized system for performing blockchain-based token management, the system comprising:
   a side-blockchain network in communication with a plurality of user devices, the side-blockchain network including:
      a plurality of nodes, wherein:
         each node of the plurality of nodes includes a node computer processor, a node non-transitory computer-readable storage medium including a plurality of node executable instructions that when executed by the node computer processor cause the node computer processor to execute sidechain smart contracts and a copy of a blockchain of the side-blockchain network,
         the sidechain smart contracts include a table factory smart contract, and table smart contracts; and
         the blockchain of the side-blockchain network includes game wallets; and
      a trust entity including a trust computer processor and a trust non-transitory computer-readable storage medium including a plurality of trust executable instructions that when executed by the trust computer processor cause the trust computer processor to sign a bridge smart contract and to execute an identity smart contract;
   wherein each of the plurality of user devices has an account associated with a sidechain user wallet, and includes a user device computer processor and a user device non-transitory computer-readable storage medium including a plurality of user device executable instructions executable by the user device computer processor, wherein:
      each of the side chain user wallets comprises a restricted wallet or an unrestricted user wallet;
   a cross-chain bridge in data communication with the side-blockchain network and a main-blockchain network, and for transferring digital assets between the side-blockchain network and the main-blockchain network, wherein:
      the cross-chain bridge includes one or more bridge nodes;
      each bridge node of the one or more bridge nodes includes a bridge node computer processor, and a bridge node non-transitory computer-readable storage medium including a plurality of bridge node executable instructions that when executed by the bridge node computer processor cause the bridge node computer processor to execute the bridge smart contract;
   wherein the bridge smart contract, when executed by the bridge node computer processor, causes the bridge node computer processor to transfer digital assets between one or more primary chain wallets and the sidechain user wallets;
   wherein the transfer of the digital assets includes depositing events and withdrawal events;
   wherein the depositing events include:
      the one or more bridge nodes receiving deposit data, wherein the deposit data includes a depositing amount of a primary chain digital token and an identifier of at least one of the primary chain user wallets; and
      the one or more bridge nodes transferring a corresponding deposit amount of a sidechain digital token to at least one of the sidechain user wallets associated with the identified at least one primary chain user wallet, wherein the corresponding deposit amount of the sidechain digital token corresponds to the depositing amount of the primary chain digital token;
   wherein the withdrawal events include:
      the one or more bridge nodes receiving withdrawal data, wherein the withdrawal data includes a withdrawing amount of the sidechain digital token and an identifier of the at least one primary chain wallet; and
      the one or more bridge nodes transferring a corresponding withdrawing amount of the primary chain digital token to the identified at least one of the primary chain wallets from the associated at least one sidechain user wallet, wherein the corresponding withdrawing amount of the primary chain digital token corresponds to the withdrawing amount of the sidechain digital token;
   wherein at least two required signatures are required for the bridge node computer processor executing the bridge smart contract to perform a withdrawal event and the at least two required signatures include a signature of an owner of the associated at least one sidechain user wallet and a signature of the trust entity;
   wherein the at least two signatures required for the transfer of the digital assets by the bridge smart contract include the signature of an owner of the associated at least one sidechain user wallet and the signature of the trust entity;
   wherein, when executed by the trust computer processor, the trust executable instructions additionally cause the trust computer processor to sign a bridge smart contract for the withdrawal event when:
      the associated at least one sidechain user wallet is an unrestricted wallet; or
      the associated at least one sidechain user wallet is a restricted wallet and the account associated with the associated at least one sidechain user wallet has met specified criteria, wherein the specified criteria identifies at least one action that the account associated with the associated at least one sidechain user wallet is required to take within a time limit;

wherein, when executed by the trust computer processor, the trust executable instructions also cause the trust computer processor not to sign a bridge smart contract for the withdrawal event when the associated at least one sidechain user wallet is a restricted wallet and the account associated with the associated at least one sidechain user wallet has not met the specified criteria;

wherein the node computer processor of executing the table factory smart contract causes the node computer processor of the plurality of nodes of the side-blockchain network to deploy the table smart contracts;

wherein each of the table smart contracts are associated with a table wallet comprising at least one of the game wallets;

wherein the node computer processor executing one of the table smart contracts causes the node computer processor of the plurality of nodes of the side-blockchain network to:
  join at least one of the accounts as a player of the table smart contract by transferring digital assets from the sidechain user wallet of the player to the table wallet associated with the table smart contract, such that the transferred digital assets stored in the table wallet are associated with the player;
  track as available funds the digital assets stored in the table wallet for a plurality of players including receiving results of an executed electronic game event associated with the table smart contract, wherein the results include a funds update identifying changes in the available funds for the player; and
  remove the player from the table smart contract by transferring the available funds for the player from the table wallet to the sidechain user wallet of the player;

wherein, when executed by the trust computer processor, the identity smart contract causes the trust computer processor to control access to the sidechain user wallets by removing the digital assets from each of the restricted wallets when the account associated with the sidechain user wallet has not met the specified criteria.

2. The decentralized system of claim 1, further comprising a client application including client executable instructions that when executed by the user device computer processor cause the user device computer processor to execute the electronic game event and provide the result of the electronic game event to the node computer processor executing the table smart contract associated with the electronic game event.

3. The decentralized system of claim 2, wherein the node computer processor executing the table smart contract associated with the electronic game event receives the result of the electronic game event including a digital signature from each user device involved with the electronic game event.

4. The decentralized system of claim 3, further comprising a plurality of justices each including a justice computer processor, a justice non-transitory computer-readable storage medium including a plurality of justice executable instructions that when executed by the justice computer processor cause the justice computer processor to observe the electronic gaming event and to digitally sign the result of the electronic game event.

5. The decentralized system of claim 1, wherein each of the table contracts is associated with an electronic game and each electronic game is associated with one or more electronic game events.

6. The decentralized system of claim 4, wherein the electronic game includes poker and each of the electronic game events comprises a hand of poker.

7. The decentralized system of claim 1, wherein:
  the bridge smart contract includes a bridge sidechain smart contract deployed on the side-blockchain network, and a bridge mainchain smart contract deployed on the main-blockchain network;
  the plurality of bridge nodes of the cross-chain bridge receives the bridge mainchain smart contract from the main-blockchain network and the bridge node computer processor of at least one of the plurality of bridge nodes initiates a corresponding bridge sidechain smart contract on the side-blockchain network.

8. The decentralized system of claim 1, wherein the sidechain smart contract additionally include at least one vault smart contract, wherein:
  each of the at least one vault smart contracts is associated with at least one table smart contract;
  the node computer processor executing the sidechain smart contract including the at least one vault smart contract receives a rake associated with at least one an electronic game event or an electronic game.

9. A computer-implemented method for blockchain-based token management using a side blockchain connected to a primary blockchain by a bridge, the computer-implemented method comprising:
  receiving, with at least one node computer processor of the side-blockchain network, deposit data from a cross-chain bridge, wherein:
    the deposit data includes a depositing amount of a primary chain digital token and an identifier of at least one primary chain user wallets;
    the side-blockchain network includes a plurality of nodes, each node of the plurality of nodes including a node computer processor;
  at least one node computer processor of the side-blockchain network executing a bridge smart contract to transfer a corresponding deposit amount of a sidechain digital token to at least one sidechain user wallet associated with the identified at least one primary chain user wallet, wherein the corresponding deposit amount of the sidechain digital token corresponds to the depositing amount of the primary chain digital token;
  receiving withdrawal data with at least one node computer processor of the side-blockchain network, wherein the withdrawal data includes a withdrawing amount of the sidechain digital token and an identifier of at least one of the primary chain wallets; and
  when the bridge smart contract associated with the withdrawal data includes at least two required signatures, a bridge node computer processor initiating the bridge smart contract to transfer a corresponding withdrawing amount of the primary chain digital token to the identified at least one of the primary chain wallets from the associated at least one sidechain user wallet, wherein:
    the cross-chain bridge in data communication with the side-blockchain network and a main-blockchain network includes one or more bridge nodes and each bridge node of the one or more bridge nodes includes a bridge node computer processor;

the corresponding withdrawing amount of the primary chain digital token corresponds to the withdrawing amount of the sidechain digital token;

the at least two required signatures include a signature of an owner of the associated at least one sidechain user wallet and a signature of a trust entity;

the trust entity includes a trust computer processor the trust computer processor of the trust entity signing the bridge smart contract for a withdrawal event when:

the associated at least one sidechain user wallet is an unrestricted wallet; or the associated at least one sidechain user wallet is a restricted wallet and the account associated with the associated at least one sidechain user wallet has met specified criteria, wherein the specified criteria identifies at least one action that the account associated with the associated at least one sidechain user wallet is required to take within a time limit;

the trust computer processor of the trust entity not signing the bridge smart contract for the withdrawal event when the associated at least one sidechain user wallet is a restricted wallet and the account associated with the associated at least one sidechain user wallet has not met the specified criteria;

wherein the node computer processor executing a table factory smart contract causes the node computer processor to deploy table smart contracts;

executing with at least one node computer processor of the side-blockchain network the table smart contract to:

join at least one player by transferring digital assets from the sidechain user wallet of each of the at least one player to a table wallet associated with the table smart contract, such that the transferred digital assets stored in the table wallet are associated with the at least one the player;

track as available funds the digital assets stored in the table wallet for a plurality of players including receiving results of an executed electronic game event associated with the table smart contract, wherein the results include a funds update identifying changes in the available funds for the at least one player; and remove the at least one player from the table smart contract by transferring the available funds for the at least one player from the table wallet to the sidechain user wallet of the player;

execute an identity smart contract with at least one node computer processor the side-blockchain network to control access to the sidechain user wallets by removing the digital assets from each of the restricted wallets when the account associated with the sidechain user wallet has not met the specified criteria.

10. The method of claim 9, further comprising executing a client application on a user device computer processor of each user device of the players from the table smart contract to:

perform the electronic game event; and provide the result of the electronic game event to the table smart contract associated with the electronic game event.

11. The method of claim 9, wherein each of the table contracts is associated with an electronic game and each electronic game is associated with one or more electronic game events.

12. The method of claim 11, wherein the electronic game includes poker and each of the electronic game events comprises a hand of poker.

* * * * *